(12) United States Patent
Winter et al.

(10) Patent No.: US 8,413,173 B2
(45) Date of Patent: Apr. 2, 2013

(54) METHOD, APPARATUS AND SYSTEM FOR AUTOMATIC LOADING OF A NETWORK STACK

(75) Inventors: Robert L. Winter, Leander, TX (US); Narayanan Subramaniam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1240 days.

(21) Appl. No.: 11/970,516

(22) Filed: Jan. 7, 2008

(65) Prior Publication Data

US 2009/0178060 A1 Jul. 9, 2009

(51) Int. Cl.
*G06F 9/44* (2006.01)

(52) U.S. Cl. ............... 719/327; 719/321; 710/8; 710/9; 710/11; 710/14

(58) Field of Classification Search .................. None
See application file for complete search history.

(56) References Cited

U.S. PATENT DOCUMENTS

| | | | | |
|---|---|---|---|---|
| 5,237,693 A * | 8/1993 | Kiyohara et al. | ............. | 709/229 |
| 5,481,706 A * | 1/1996 | Peek | ............................. | 710/200 |
| 5,619,645 A * | 4/1997 | Montenegro et al. | ........... | 714/48 |
| 5,636,371 A * | 6/1997 | Yu | ................................. | 703/26 |
| 5,699,350 A * | 12/1997 | Kraslavsky | .................... | 370/254 |
| 5,721,876 A * | 2/1998 | Yu et al. | ............................ | 703/27 |
| 5,751,972 A * | 5/1998 | Quinn et al. | ................... | 709/223 |
| 5,958,010 A * | 9/1999 | Agarwal et al. | ............... | 709/224 |
| 6,061,796 A * | 5/2000 | Chen et al. | ...................... | 726/15 |
| 6,085,250 A * | 7/2000 | Perry | ............................. | 709/230 |
| 6,098,112 A * | 8/2000 | Ishijima et al. | ............... | 719/321 |
| 6,148,336 A * | 11/2000 | Thomas et al. | ............... | 709/224 |
| 6,963,905 B1 * | 11/2005 | Melman | ......................... | 709/213 |
| 7,535,926 B1 * | 5/2009 | Deshpande et al. | .......... | 370/469 |
| 2001/0044904 A1 * | 11/2001 | Berg et al. | ...................... | 713/201 |
| 2002/0059517 A1 * | 5/2002 | Haviv et al. | ................... | 713/154 |
| 2003/0140153 A1 * | 7/2003 | Lawrence | ...................... | 709/230 |
| 2003/0149797 A1 * | 8/2003 | Nagarajayya et al. | ......... | 709/313 |
| 2004/0010674 A1 * | 1/2004 | Boyd et al. | ..................... | 711/170 |
| 2004/0057441 A1 * | 3/2004 | Li et al. | .......................... | 370/401 |
| 2004/0088418 A1 * | 5/2004 | Iyer et al. | ....................... | 709/227 |
| 2005/0022011 A1 * | 1/2005 | Swander et al. | ............... | 713/201 |
| 2005/0025183 A1 * | 2/2005 | Galand et al. | ................. | 370/469 |
| 2005/0086349 A1 * | 4/2005 | Subramaniyan | .............. | 709/230 |
| 2005/0220061 A1 * | 10/2005 | Wawra et al. | .................. | 370/338 |
| 2005/0238050 A1 | 10/2005 | Pung et al. | | |
| 2005/0271061 A1 * | 12/2005 | Nguyen et al. | ........... | 370/395.52 |

OTHER PUBLICATIONS

"Basic Transition Mechanisms for IPv6 Hosts and Routers" by Nordmark et al. from URL: http://tools.ietf.org/pdf/rfc4213.pdf (PDF file "rfc4213.pdf") published Oct. 2005.*

\* cited by examiner

*Primary Examiner* — Andy Ho
*Assistant Examiner* — Shih-Wei Kraft
(74) *Attorney, Agent, or Firm* — Baker Botts L.L.P.

(57) ABSTRACT

The disclosure provides a method and system for loading a first and second Internet Protocol network communication stacks in an information handling system (IHS). The method and system include loading the first Internet Protocol network communication stack and creating and registering a module management kernel thread to automatically load the second Internet Protocol network stack only when called upon. The kernel thread registers with the IHS' kernel socket layer and Ethernet driver to receive notice of calls corresponding to the second Internet Protocol network communication stack. Upon receiving notice, the kernel thread loads the second Internet Protocol network communication stack and subsequently deregisters from the IHS' kernel socket layer and Ethernet driver.

8 Claims, 4 Drawing Sheets

MAC Address

Ethernet Frame Format

METHOD, APPARATUS AND SYSTEM FOR AUTOMATIC LOADING OF A NETWORK STACK

BACKGROUND

1. Technical Field

The present disclosure relates generally to the field of information handling systems. More specifically, but without limitation, the present disclosure relates to loading a network stack.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In information handling systems (IHSs), Internet Protocol version 4 (IPv4) may be used as a network layer protocol. The Internet Engineering Task Force (IETF) has recently adopted Internet Protocol version 6 (IPv6) as a successor to IPv4 providing a much larger address space and greater flexibility in assigning addresses. Currently, many IHSs employing IPv4 have not switched over to utilizing IPv6. The Department of Defense Joint Interoperability Test Committee guideline for IPv6 requires that vendors provide dual IPv4 and IPv6 interoperability. In some IHSs, this may require an IHS to load both an IPv4 network stack and an IPv6 network stack.

In some embedded networking information handling systems, loading a network stack may be a manual process. An administrator or the like could manually load one or more network stacks that may run at all times. An IHS may not have any means for automatically loading a network stack based on dynamic networking needs. Since an IHS may have limited central processing unit (CPU), memory, and/or input/output (I/O) resources, loading an IPv6 network stack when an IHS does not participate in IPv6 networking may waste resources and affect performance.

Thus a need remains for methods, apparatus and systems for automatically loading an IPv6 network stack based on the needs of an IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for loading software in an information handling system (IHS). The method includes registering a kernel entity with an interface to receive a first notification when a socket library utilized for a communication protocol is requested and initializing software after receiving the first notification.

Another aspect of the disclosure provides an information handling system (IHS) which includes a kernel entity, wherein the kernel entity is registered with an interface to receive a first notification when a socket library utilized for a communication protocol is requested and software for utilization with the communication protocol, wherein the kernel entity initializes the software after receiving the first notification.

Yet another aspect of the disclosure provides a method for loading software in an information handling system (IHS). The method includes registering a kernel entity with an interface to receive a first notification when a socket library utilized for a communication protocol is requested and registering an ethernet driver to receive a second notification of incoming data utilizing the communication protocol. The method may also include determining whether an identifier has a first value and a portion of the identifier does not have a second value after receiving the second notification, and initializing software after receiving the first notification only if the identifier includes a first value and a portion of the identifier does not include a second value.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
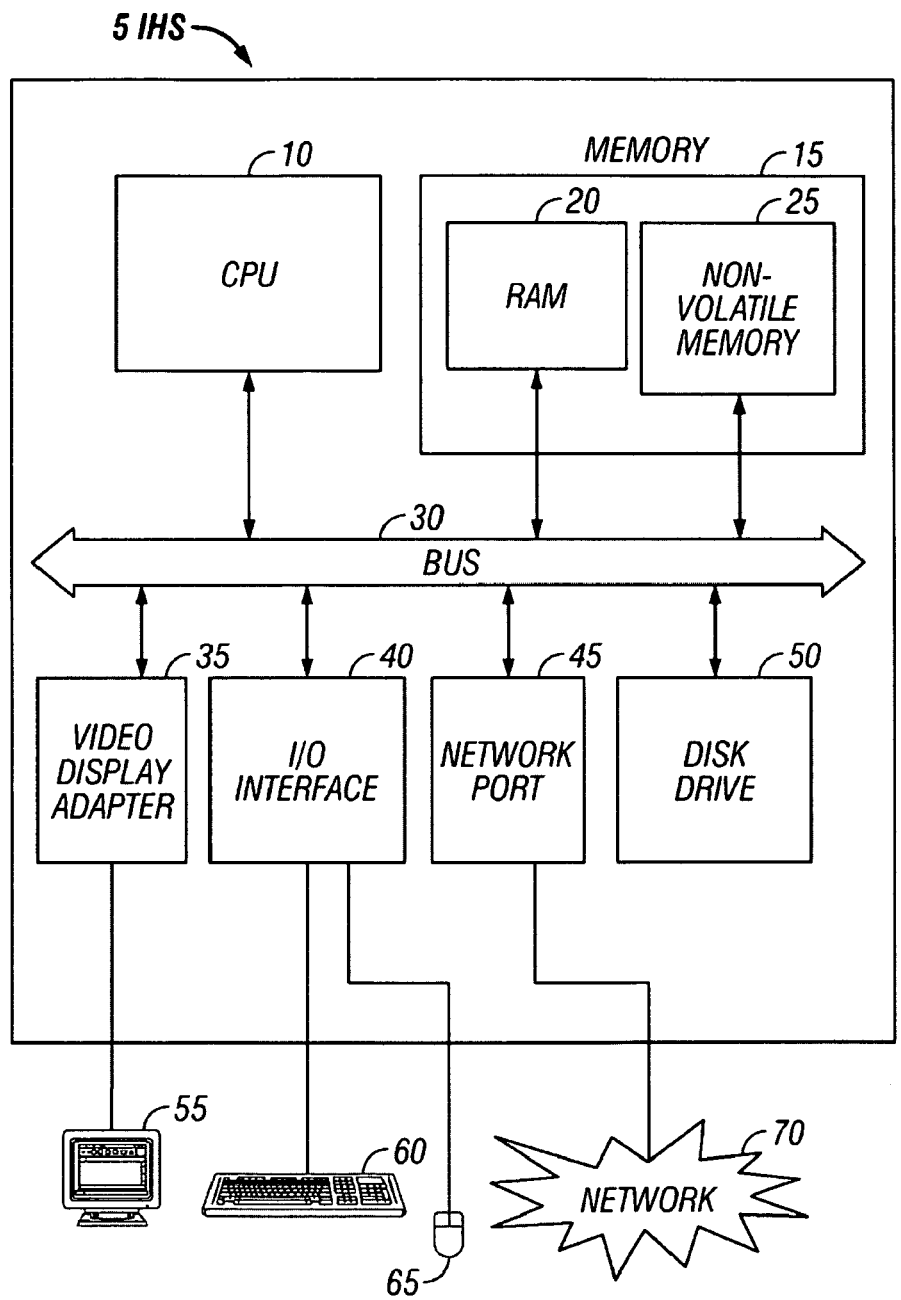
FIG. 1 provides an illustrative schematic of an information handling system (IHS) according to the present disclosure.

Although the invention may be described with reference to specific implementations, it will be understood by those skilled in the art that various changes may be made without departing from the spirit or scope of the invention. Various examples of such changes have been given in the forgoing description. Accordingly, the disclosure of particular implementations is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations. For simplicity and clarity of illustration, the drawing and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
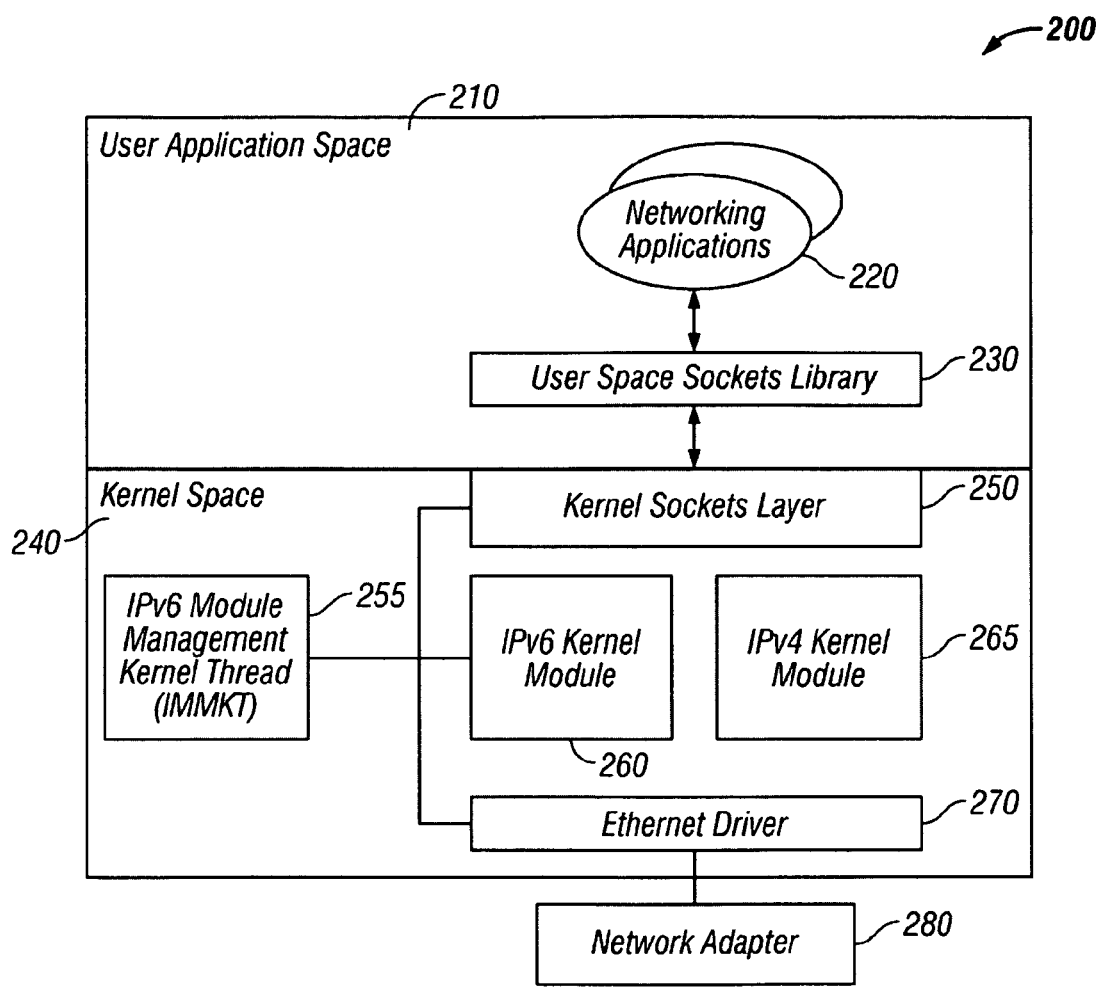
FIG. 2 provides an illustrative implementation of a kernel space and an user/application space.

FIG. 2 provides an illustrative implementation of a user/application space and an IPv6 kernel module in kernel space. An operating system (OS) may segregate virtual memory into a kernel space 240 and a user/application space 210. A kernel space 240 may be reserved for running a kernel, kernel extensions, some device drivers and the like. A kernel may be a central component of an OS that manages system resources. For example, a kernel may manage interactions between software and hardware components. A user or application space 210 may be utilized to run applications or the like. In an IHS 200, one or more networking applications 220 may operate in a user or application space 210. A networking application 220 may allow an IHS to receive or transmit data utilizing a particular communication protocol (e.g., IPv4 or IPv6). Networking applications 220 may be coupled to one or more user space sockets libraries 230. A socket library may contain functions or the like that may be used to support a communication protocol requirement of an application. A user space sockets library 230 may be coupled with a kernel space 240, for example, the kernel sockets layer 250 or vice versa. A kernel socket layer 250 may include an interface or the like that allows the kernel space 240 to communicate with the user space 210. A kernel space 240 may have one or multiple kernels or kernel modules 260 for managing resources. For example, an IPv6 kernel module or network stack 260 and an IPv4 kernel module or network stack 265 may be utilized to handle communications involving a particular protocol. A kernel module or network stack 260 may contain software or instructions indicating how to manage an interaction between hardware and software in accordance with a communication protocol. In some cases, a kernel module or network stack may be loaded at all times regardless of need. However, an IPv6 module management kernel thread (IMMKT) 255 may automatically load an IPv6 module 260 only when needed. A kernel thread is a kernel entity that may execute user functions, library calls, system calls and/or the like. An IMMKT 255 is a dedicated low footprint module that may be created and initialized during kernel initialization. An IMMKT 255 may register with a kernel socket layer 250. For example, registration may include a process of informing a layer or component in a user space or kernel space of a desire to be notified of the occurrence a particular event. In one implementation, an IMMKT 255 may register with the kernel socket layer 250 to be notified of socket library calls involving IPv6 addresses. An IMMKT 255 may also register with an ethernet driver 270 to receive notice of incoming ethernet frames with a protocol ID or EtherType corresponding to IPv6 (i.e., 0x8DD). An ethernet driver 270 may be a program that allows applications to interact with an ethernet device. An ethernet driver 270 may be coupled to a network adapter 280 that may receive and transmit ethernet frames. Ethernet frames may contain data organized according to a communication protocol to be transmitted and/or received. An ethernet frame format is discussed further below.

In some IHSs, CPU, memory, I/O and/or other resources may be limited. By loading an IPv6 stack only when it is needed, an IHS may preserve it resources. For example, blade servers may have limited resources because of space, power, and/or other considerations. Automatically loading an IPv6 stack only when a blade server requires the stack may save CPU, memory, I/O and/or other resources. An IHS 200 may detect when an IPv6 stack is needed by receiving notification of a frame with an IPv6 EtherType (i.e., 0x86DD) or receiving notification of a IPv6 library socket call. In one possible implementation, the IMMKT 255 may initialize an IPv6 kernel module 260 if certain conditions indicate an IPv6 stack is required. For instance, initialization of a kernel module may include loading, installing, and/or the like. Once the IPv6 stack is loaded, the IMMKT 255 may deregister itself from the ethernet driver 270 and the kernel socket layer 250 so that notification of incoming IPv6 ethernet frames and IPv6 socket library calls are not given to the IMMKT 255. For example, deregistration may include a process of informing a layer or component in a user space or kernel space that notification of the occurrence of a particular event is no longer required. These notifications may not be required since an IPv6 kernel module 260 has already been loaded.

Figure 3:
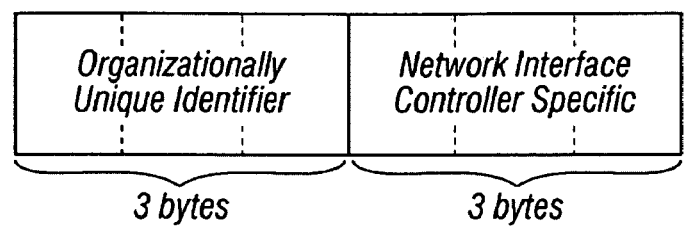
FIG. 3 represents an illustrative implementation of an ethernet frame format.

FIG. 3 provides an illustrative implementation of a MAC address format. A MAC address is a 48 bit address for a network adapter, which may be a quasi-unique identifier. Each octet in a MAC address may be provided in a hexadecimal format with each octet separated by a dash or a colon (e.g., AA-BB-CC-DD-EE-FF or AA:BB:CC:DD:EE:FF). The first three octets of a MAC address may represent an organizationally unique identifier (OUI). An OUI may identify a particular manufacturer, vendor, or other information associated with a source of an IHS. In addition, a portion of an OUI is reserved for flags. For example, the first two octets of a MAC address may have a value of 33:33 for an IPv6 multicast address. The last three octets may be network interface controller (NIC) specific. For example, the last three octets may represent a model number or serial number of a NIC. By examining a MAC address, it may be determined whether an IPv6 network stack should be loaded (discussed below).

Figure 4:
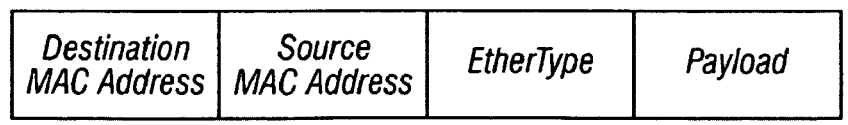
FIG. 4 provides an illustrative implementation of a MAC address format.

FIG. 4 represents an illustrative implementation of an ethernet frame format. As used herein, an ethernet frame may refer to a data packet which may include information such as a destination MAC address, a source MAC address, an EtherType, and a payload. It is appreciated by one of ordinary skill in the art that an ethernet frame format may include some but not all information shown in FIG. 4 or it may contain additional information. A destination MAC address may provide an address for a device to which data is to be transmitted. A source MAC address may provide an address of a device providing data. An EtherType field may indicate which protocol an ethernet frame is using. For example, an EtherType of 0x0800 may represent IPv4 or an EtherType of 0x86DD may represent IPv6. A payload field may contain the data to be transmitted or that has been received. As discussed previously, by determining the EtherType, an ethernet driver may detect an IPv6 frame and load an IPv6 network stack accordingly.

Figure 5:
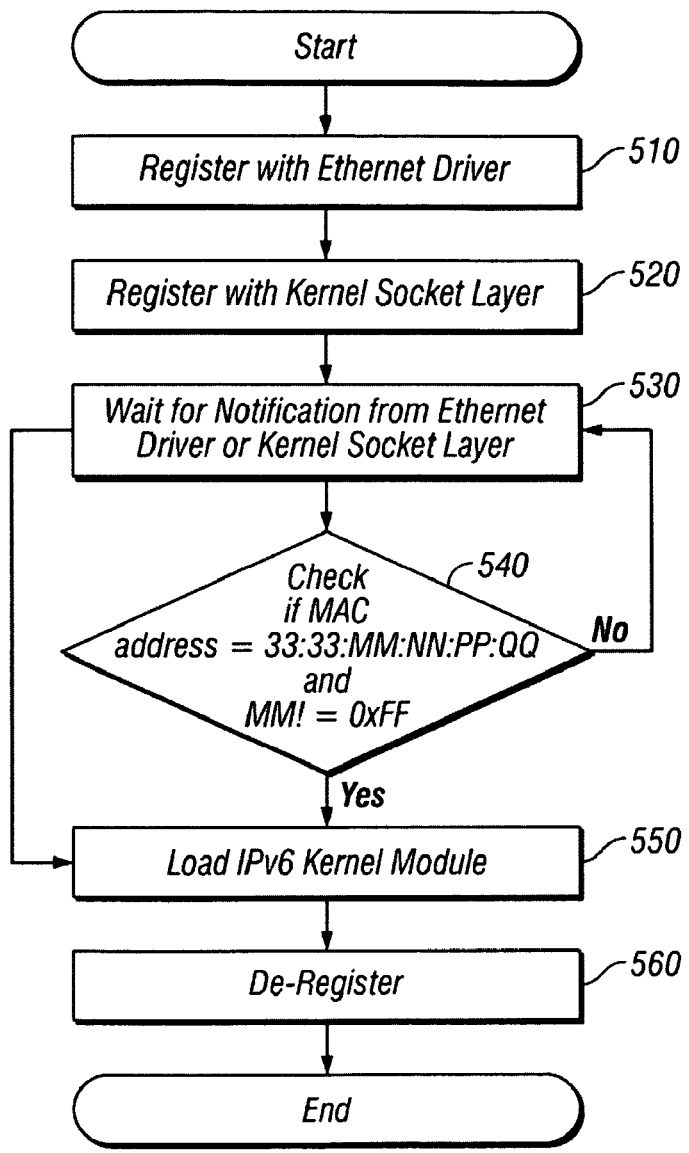
FIG. 5 represents an illustrative method for automatic loading of a network stack.

FIG. 5 represents an illustrative method for automatic loading of a network stack. Various methods are contemplated including all or less than all of the steps shown in methods described herein and/or mentioned below, any number of repeats or any of the steps shown and/or mentioned below, and in any order. While the implementation discussed may refer to an IPv6 network stack, one of ordinary skill would recognize that a similar method can be performed for other types of network stacks. In step 510, an IPv6 module management kernel thread (IMMKT) may register with an ethernet driver to receive notification of incoming frames with an EtherType corresponding to IPv6 (i.e., 0x86DD). The IMMKT may also register with a kernel socket layer to receive notification of socket library calls involving IPv6 addresses in step 520. For example, the IMMKT may register with kernel socket interfaces to receive notification. Next, the IMMKT may wait for notification from the ethernet driver or the kernel socket layer in step 530. When notification of a socket library call involving an IPv6 address in received from the kernel socket layer, the IMMKT may immediately load an IPv6 kernel module in step 550.

When notification of a frame with EtherType 0x86DD is received from the ethernet driver, the IMMKT may perform a two part check in step 540. First, the IMMKT may determine if a destination MAC address includes a value corresponding to IETF specifications for an IPv6 multicast MAC address (i.e., 33:33:MM:NN:PP:QQ). As discussed previously, a prefix of 33:33 in a MAC address may represent an IPv6 multicast address. Further, MM:NN:PP:QQ or the last four octets of a MAC address may be any combination of hexadecimal values. The first four bits or nibble of an octet may not be equal to the second nibble of the octet. However, a message with a prefix of 33:33 may not require an IPv6 kernel module to be loaded, such as an IPv6 solicited node multicast. Second, the IMMKT may determine the value of a third octet of the MAC address. The third octet should not include a value of 0xFF (i.e., MM !=0xFF). If the third octet includes a value of 0xFF, then a message may be an IPv6 solicited node multicast. An IPv6 network stack does not need to be loaded since an IPv6 solicited node multicast may be used for duplicate address detection (DAD). If the third octet is not equal to 0xFF, then a message may not be an IPv6 solicited node multicast. For example, a message may correspond to a router advertisement IPv6 multicast message (i.e., an IPv6 capable router is present on a link/segment). It may also indicate a well known or custom/private IPv6 message. If a message includes a prefix of 33:33 in a destination MAC address and the message is not an IPv6 solicited node multicast, then an IPv6 kernel module may be loaded in step 550.

If either check fails in step 540, the IMMKT returns to step 530 and waits for notification from an ethernet driver. If both checks are satisfied in step 540, then the IMMKT may immediately load the IPv6 kernel module in step 550. Once an IPv6 kernel module is loaded, notification is no longer needed so the IMMKT may deregister itself from the ethernet driver and kernel socket layer in step 560. The method discussed herein may allow an IPv6 network stack to be used only when it is needed. In systems with limited resources, this may allow CPU, memory, I/O or other resources to be conserved.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for loading a first and second Internet Protocol network communication stacks in an information handling system (IHS) having a kernel socket layer and a communications device driver, the method comprising:
    loading the first Internet Protocol network communication stack;
    creating and registering a module management kernel thread to automatically load the second Internet Protocol network communication stack only when called upon, wherein the second Internet Protocol network communication stack corresponds to Internet Protocol version 6 (Ipv6) communications;
    registering the kernel thread with the kernel socket layer of the IHS and communications device driver to receive from either a notice of calls corresponding to the second Internet Protocol network communication stack, wherein the notice of calls corresponding to the second Internet Protocol network communication stack includes an identifier comprising a three-octet subset of a media access control (MAC) address; and
    loading by the kernel thread of the second Internet Protocol network communication stack upon receiving notice of calls corresponding to the second Internet Protocol network communication stack only if the first two octets of the identifier include the value 33:33 and the third octet does not include the value 0xFF.

2. The method of claim 1 further comprising deregistering the kernel thread from the kernel socket layer of the IHS and communication device driver after loading the second Internet Protocol network communication stack.

3. The method of claim 2, wherein the device driver is an ethernet driver that provides the notification when the incoming data has an EtherType of 0x86DD.

4. An information handling system (IHS) having a kernel socket layer and a communications device driver, comprising:
   a processor capable of executing a set of instructions;
   a memory device in data communication with the processor upon which the set of instructions may be stored, the set of instructions when executed effects:
      loading a first Internet Protocol network communication stack;
      creating and registering a module management kernel thread to automatically load a second Internet Protocol network communication stack only when called upon, wherein the second Internet Protocol network communication stack corresponds to Internet Protocol version 6 (Ipv6) communications;
      registering the kernel thread with the kernel socket layer of the IHS and communications device driver to receive from either a notice of calls corresponding to the second Internet Protocol network communication stack, wherein the notice of calls corresponding to the second Internet Protocol network communication stack includes an identifier comprising a three-octet subset of a media access control (MAC) address; and
      loading by the kernel thread of the second Internet Protocol network communication stack upon receiving notice of calls corresponding to the second Internet Protocol network communication stack only if the first two octets of the identifier include the value 33:33 and the third octet does not include the value 0xFF.

5. The system of claim 4, further effecting deregistering the kernel thread from the kernel socket layer of the IHS and communication device driver after loading the second Internet Protocol network communication stack.

6. The system of claim 5, wherein the device driver is an ethernet driver that provides the notification when the incoming data has a first EtherType of 0x86-DD.

7. A method for loading a second Internet Protocol network communication stack in an information handling system (IHS) already provided with a first Internet Protocol network communication stack, the method comprising:
   providing a kernel socket layer and a communications device driver in the IHS;
   creating and registering a module management kernel thread to automatically load the second Internet Protocol network communication stack only when called upon, wherein the second Internet Protocol network communication stack corresponds to Internet Protocol version 6 (Ipv6) communications;
   registering the kernel thread with the kernel socket layer of the IHS and communications device driver for the kernel thread to receive from either a notice of calls corresponding to the second Internet Protocol network communication stack, wherein the notice of calls corresponding to the second Internet Protocol network communication stack includes an identifier comprising a three-octet subset of a media access control (MAC) address; and
   loading by the kernel thread of the second Internet Protocol network communication stack upon receiving notice of calls corresponding to the second Internet Protocol network communication stack only if the first two octets of the identifier include the value 33:33 and the third octet does not include the value 0xFF.

8. The system of claim 7, further effecting deregistering the kernel thread from the kernel socket layer of the IHS and communication device driver after loading the second Internet Protocol network communication stack.

* * * * *